Dec. 28, 1965 H. WEISS ETAL 3,226,225

ELECTRONIC SEMICONDUCTOR MEMBERS AND METHOD OF THEIR MANUFACTURE

Filed April 17, 1963 4 Sheets-Sheet 1

United States Patent Office 3,226,225
Patented Dec. 28, 1965

3,226,225

ELECTRONIC SEMICONDUCTOR MEMBERS AND METHOD OF THEIR MANUFACTURE

Herbert Weiss and Manfred Wilhelm, Nurnberg, Germany, assignors to Siemens-Schuckertwerke Aktiengesellschaft, Berlin-Siemensstadt, Germany, a corporation of Germany Filed Apr. 17, 1963, Ser. No. 273,776
Claims priority, application Germany, July 31, 1962, S 80,682
14 Claims. (Cl. 75—134)

Our invention relates to electronic semiconductor devices of various types, preferentially to those utilizing galvanomagnetic effects of semiconductors such as magnetically variable resistors and potentiometers, Hall-voltage generators and related modulators, or photoelectric devices. In one of its aspects, our invention is an improvement upon devices of the type described in U.S. Patent 2,894,234 of H. Weiss and H. Welker.

According to our invention, we have discovered that electronic devices for the above-mentioned and various other purposes can be greatly improved and made amenable to improved or novel uses by providing such devices with a semiconductor member whose crystalline body is not crystallographically homogeneous but contains, integrally embedded in the semiconductor substance proper, a multitude of electrically or magnetically different inclusions of individually small size as compared with those of the member and mutually spaced and generally aligned to form a spacial matrix within the crystal. Preferably the discrete inclusions are non-doping relative to the embedding semiconductor substance. More specifically, the embedding substance, in the metallurgical sense, consists of one phase, such as the eutectic, of the material, and the inclusions consist of a segregated second phase of the material.

According to another feature of our invention the geometric shape of the discrete and dispersed inclusions is anisotropic. This term is understood to mean that the inclusions have a preferred extension in at least one direction. The preferred inclusions described hereinafter are generally in the shape of needles or flakes as contrasted to predominantly globular shapes.

Before dealing with further features of our invention, some of the objects and advantages thereof will be explained presently.

It is known from the above-mentioned patent that semiconductors of high carrier mobility afford obtaining a large change in electric resistance in response to changes of a magnetic field to which the semiconductor is subjected. This galvanomagnetic effect is particularly evident if the geometric shape of the semiconductor is not that of an elongated rod with respective electrodes at the two ends, but if the semiconductor is shaped as a rectangular plate or circular disc. For example, when a rectangular plate of indium antimonide is subjected to a magnetic field of 10,000 gauss, the electric resistance is increased about ten times if the ratio of electrode width to mutual electrode spacing is 3 to 1. To permit producing such plates with a highest feasible ohmic resistance, the semiconductor body must be provided with electrically good conducting intermediate layers corresponding to FIGS. 6 and 7 of Patent 2,894,234. This can be done by attaching a matrix of silver by an alloying or diffusion process. Such a process is rather difficult to perform and involves skillful use of special equipment.

Since according to our invention the semiconductor crystal itself is provided with an internally distributed matrix of electrically or magnetically good conducting inclusions, it is unnecessary to subsequently attach a silver matrix. The invention thus satisfies the object and achieves the advantage of eliminating the above-mentioned difficulties of the method heretofore employed.

In a semiconductor member according to the invention, the dispersed inclusions of good conducting material can readily be given a rather dense arrangement with virtually complete freedom as to the shape of the semiconductor member which, for example, can be made in the form of very thin wafers. That is, no limitation is imposed upon the shape and dimensions by the necessity heretofore encountered of subsequently attaching a predefined silver matrix to the semiconductor body.

In this respect, therefore, the invention also satisfies the object and achieves the advantage of more readily affording the production of high-ohmic semiconductor devices. Furthermore, in semiconductor members according to the invention the mutual spacing of the embedded inclusions usually amounts to but a few microns, and such a slight spacing can hardly ever be achieved by subsequently precipitating silver upon the semiconductor.

Another object of our invention is to improve the operational reliability of the semiconductor members, this being achieved by virtue of the fact that loosening of the matrix, as may occasionally occur with the known devices mentioned above, is impossible in a device according to the invention.

Further objects and advantages of our invention will be apparent from the following.

The inclusions, such as those consisting of material having better conductance than the embedding semiconductor substance, need not necessarily be arranged in regular distribution but may also consist of inclusions or dispersions, such as scale-shaped segregations, that are promiscuously distributed within the semiconductor. It is generally of advantage, however, that the ratio of mutual spacing to the scale diameter is not too large, although the inclusions should remain spaced from one another, and the axes normal to the respective scale areas should be approximately parallel to each other.

A good result is also obtained if the inclusions are needle shaped, particularly if the longitudinal axes are substantially perpendicular to the flow of the electric current and perpendicular to the magnetic flux effective during operation of the semiconductor device.

As mentioned above, the inclusions, as a rule, consist of a segregated second phase which does not have doping action upon the embedding phase of the semiconductor substance proper. Any necessary doping, therefore, should be provided by the conventional addition of donors or acceptors in the usual manner. Doping by the segregated second phase would reduce the electron mobility in the semiconductor and thereby also the change of resistance in the magnetic field, and would also reduce the specific resistance of the semiconductor member.

It will be understood from the foregoing that the embedding semiconductor phase and the segregated second phase do not form a mix crystal (solid solution), in addition to the preferential condition for magnetoresistance devices that the semiconductor be not doped by the inclusions and that the latter preferably have an anisotropic structure.

A further advantage of the invention is the fact that, by virtue of the high-ohmic resistance and the simultaneous high carrier mobility, the semiconductor member is well suitable as a component in devices utilizing the Hall effect, for example in direct-voltage modulators and contactless potentiometers based upon the galvanomagnetic effect.

Semiconductor members and devices according to the invention are further suitable for measuring, regulating or controlling magnetic fields or for performing measuring, regulating or controlling operations in response to positional changes effected by displacement of the semiconductor member relative to a magnetic field.

In addition, a semiconductor member according to the invention is generally applicable wherever anisotropic electrical properties are desired, for example for photoelectric purposes.

Suitable as embedding semiconductor substance in devices according to the invention are semiconductor compounds, preferably of the $A^{III}B^{V}$ type, such as indium antimonide, indium arsenide and gallium antimonide, for example. Also applicable as embedding phase is a semiconducting element from the fourth group of the periodic system, for example germanium.

Generally suitable as inclusions for the above-mentioned semiconductor $A^{III}B^{V}$ compounds are corresponding compounds of iron, nickel, cobalt or chromium. Thus, nickel antimonide, cobalt antimonide, iron antimonide or chromium antimonide (NiSb, $CoSb_3$, $FeSb_2$, $CrSb_2$) can be employed generally as inclusions in an indium-antimonide (InSb) crystal. Also applicable as inclusions are ferromagnetic substances, for example manganese antimonide (MnSb). However, the inclusions may also consist of metals, for example of antimony, if the embedding semiconductor crystal consists of InSb or GaSb. Inclusions of Fe-, Ni-, Co-, Mn- germanides are applicable is an embedding crystal of germanium.

The inclusions are either uniformly distributed over the entire cross section of the semiconductor body or only in given regions of the semiconductor body.

Semiconductor members according to the invention can be produced, for example, by melting the embedding semiconductor substance together with the inclusion material, such as an electrically good conducting material, in a suitable melting vessel such as a quartz boat. The melt is thereafter subjected to cooling and freezing. As mentioned, it is preferred and most advantageous to have the inclusions oriented in the crystal. For this purpose the freezing process must be performed accordingly, for instance by the so-called normal freezing method which permits the ingot to commence freezing at one end and to progressively solidify toward the other end, thus causing the occurrence of segregations in the form of the desired oriented inclusions. A similar orientation is obtainable by subjecting the ingot to zone melting. Another method of enforcing a desired orientation of the anisotropic inclusions is to perform the freezing under the effect of an external magnetic field.

As a rule, such a segregation of an insoluble phase in an embedding or base phase and an orientation of the segregations for the purposes of our invention can be achieved only if the ingot is produced from a melt of substantially eutectic composition. For obtaining anisotropic and oriented inclusions therefore, the selection of the base phase and the second phase from the above-exemplified materials should be such that the two substances form a eutectic with each other, and the composition of the melt should substantially correspond to the eutectic. Then the melt is homogeneous, and the inclusions come about only during freezing by segregation of the minor phase from the embedding semiconductor phase, these phases being mutually insoluble in the solid state. For this reason, cobalt antimonide ($CoSb_3$) is less suitable in conjunction with InSb crystals because it does not form a eutectic with InSb so that no needles or other anisotropic segregations occur. However, oriented anisotropic inclusions are obtainable, for example, with the following eutectic melts: InSb-Sb, GaSb-Sb, Ni-Sb, InSb-NiSb, InSb-MnSb, InSb-$CrSb_2$, InSb-$FeSb_2$, Ge-Ni, Ge-Mn, Ge-Fe, Ge-Co.

The invention will be further described with reference to the accompanying drawings illustrating various embodiments of the invention by way of example.

Figure 6A:
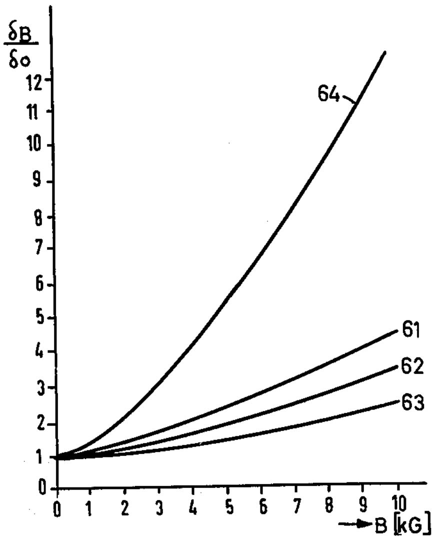
Figure 6B:
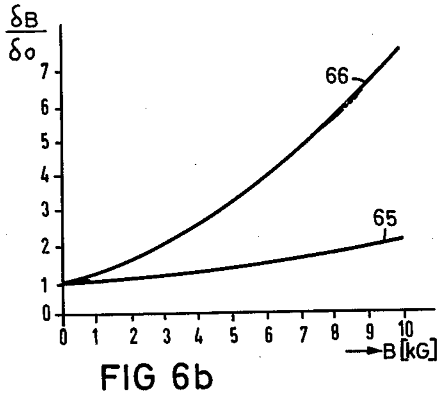

FIGS. 6*a* and 6*b* are explanatory graphs relating to the change in resistance in dependence upon the magnetic field for different semiconductor members according to the invention.

Figure 7:
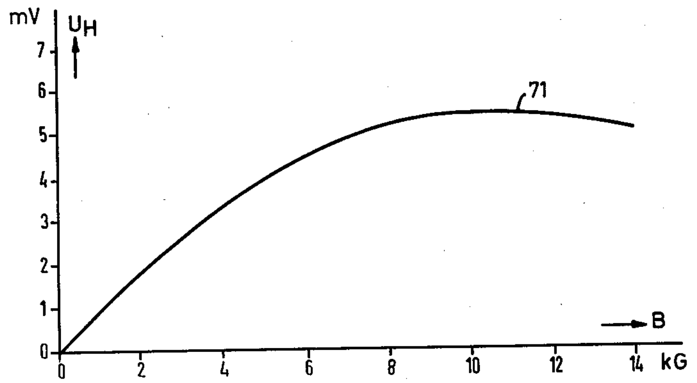

FIG. 7 is a graph exemplifying the dependence of the Hall voltage upon the magnetic induction.

Figure 8:
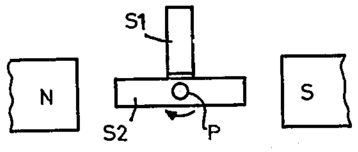
Figure 9:
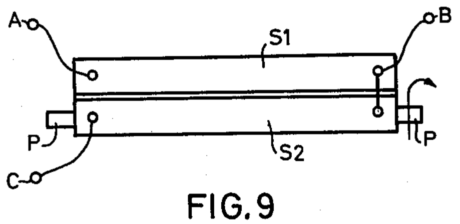
Figure 10:
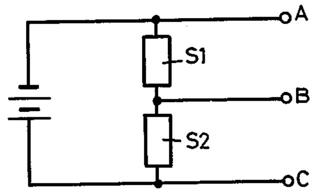
Figure 11:
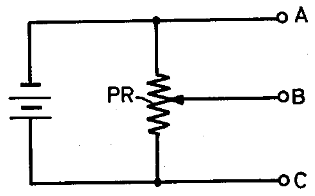

FIG. 8 shows schematically a stepless potentiometer device according to the invention, FIG. 9 is a lateral view of the appertaining semiconductor members, FIG. 10 shows the corresponding circuit diagram, and FIG. 11 is an equivalent diagram for explanatory purposes.

Figure 12:
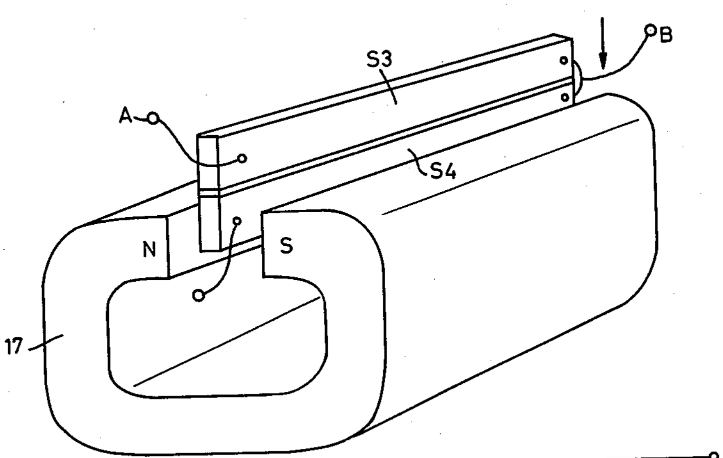

FIG. 12 is a schematic and perspective view of another potentiometric device.

Figure 13:
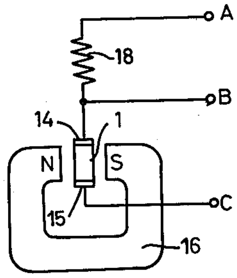
Figure 14:
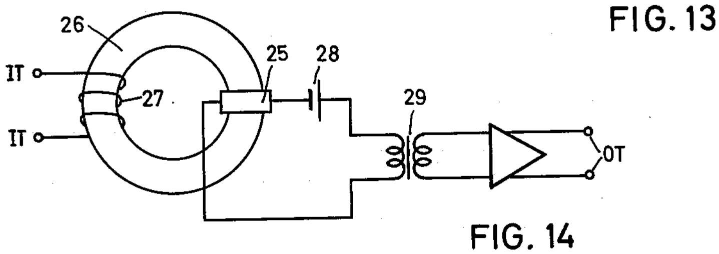

FIG. 13 is the circuit diagram of still another potentiometric device. FIG. 14 is the circuit diagram of a direct-voltage modulator.

Figure 15:
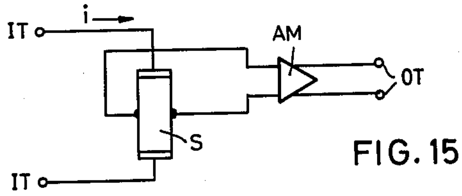
Figure 16:
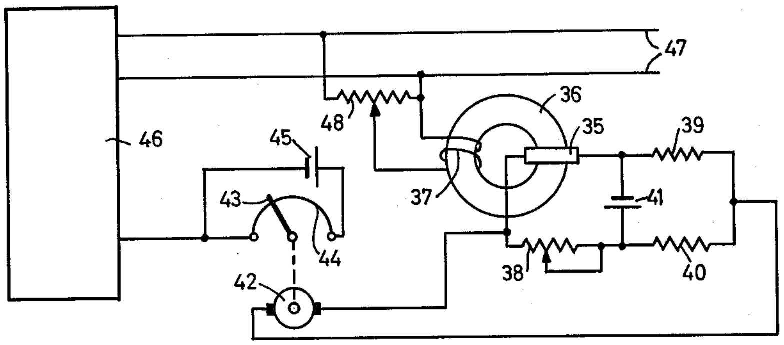
Figures 17, 18, 19, 20, 21:
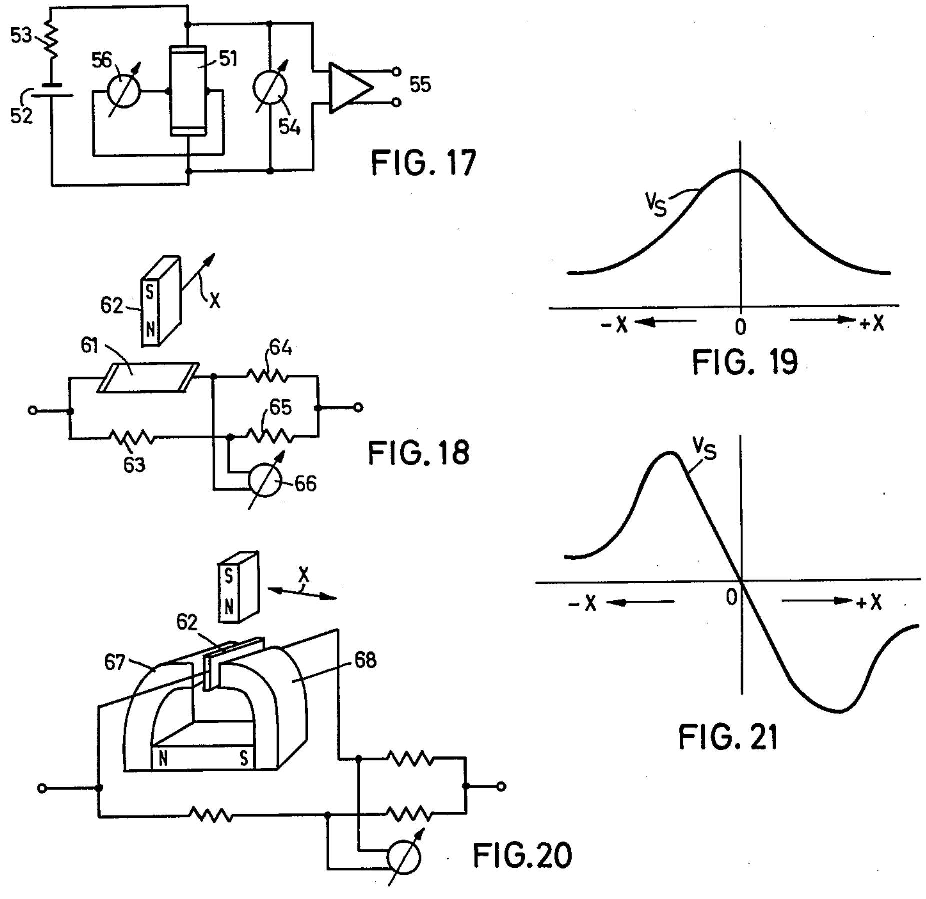

FIGS. 15, 16 and 17 are schematic circuit diagrams of regulating devices.

FIG. 18 is a circuit diagram and FIG. 19 an explanatory graph relating to a position-responsive signal transmitter, and FIGS. 20 and 21 are a circuit diagram and an explanatory graph of another signal transmitter.

Figures 1, 2, 3, 4, 5:
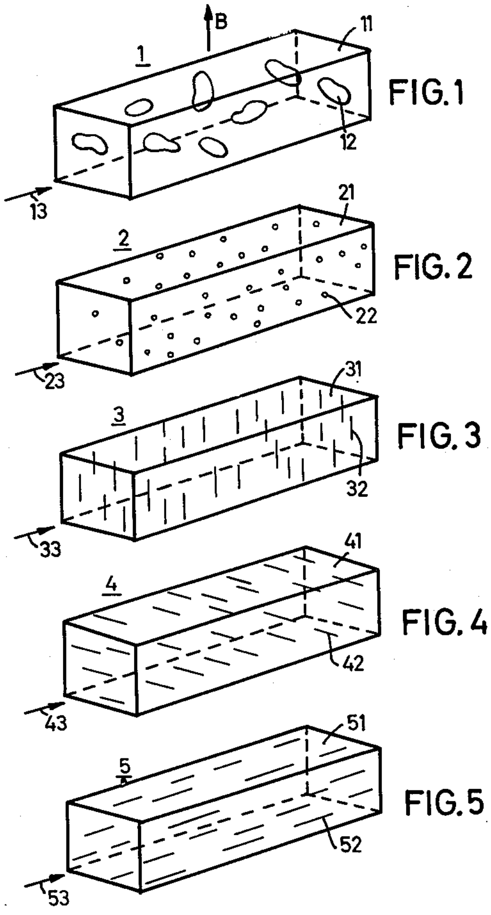
FIG. 1 shows in schematic perspective a semiconductor member according to the invention with flake-shaped inclusions.
FIG. 2 shows similarly a semiconductor member with globular inclusions.
FIGS. 3, 4 and 5 show three semiconductor members with needle-shaped inclusions of respectively different orientations.

The semiconductor member shown in FIG. 1 consists of a crystalline semiconductor body 1, for example of indium antimonide, and area-type inclusions or flakes 12 of good electrical conductance in comparison with the semiconductor material. The inclusions consist, for example, of nickel antimonide (NiSb). The semiconductor substance and inclusion material in the embodiments according to FIGS. 2 to 5 may consist of the same respective substances just mentioned, or of any of the other combinations mentioned elsewhere in this specification.

It should be understood that in a complete device according to the invention the elongated semiconductor member according to FIG. 1 is provided with terminal electrodes. In the illustrated embodiment these electrodes are understood to be attached to the axial end faces of the crystal such as those shown at 14 and 15 in FIG. 13, for example. During operation, the electric current, represented in FIG. 1 by the arrow 13, flows through the semiconductor member in the direction of its longitudinal axis. The semiconductor member, for utilization of the magneically responsive change in resistance, is simultaneously subjected to a magnetic field such as the one produced in the field gap between the poles N and S of the magnet 15 shown in FIG. 13. The direction of the magnetic field is indicated in FIG. 1 by an arrow B. The inclusions 12 according to FIG. 1 are irregularly distributed in the semiconductor substance of the member.

Relative to the semiconductor members shown in FIGS. 2 to 5, the following description is based on the asumption that they are connected and used in the same manner as described by way of example with reference to FIG. 1.

The semiconductor member according to FIG. 2 contains in its crystalline semiconductor body 21 a multitude of point-shaped or small globular inclusions 22 of irregular distribution. The electric current, indicated by an arrow 23, flows through the body in the direction of its longitudinal axis.

The semiconductor member 3 shown in FIG. 3 contains in the interior of its crystalline body 31 a multitude of needle-shaped inclusions 32. The longitudinal axes of the needles are oriented in parallel relation to each other, namely so that the electric current, indicated by an arrow 32, flows in a direction perpendicular to the longitudinal axes of the needles, and the external magnetic field B is directed parallel to the longitudinal axes of the needles.

The semiconductor member 4 according to FIG. 4 contains in its crystalline body 41 a matrix of needle-shaped inclusions 42 so oriented that their mutually parallel longitudinal axes extend substantially perpendicular to the longitudinal axis of the semiconductor body. The electric current axis, denoted by the arrow 43, and the direction of the external magnetic field B are perpendicular to each other and also perpendicular to the longitudinal direction of the needles.

According to FIG. 5, the semiconductor body 5 contains in its crystalline body 51 a matrix of needle-shaped inclusions 52 in such orientation that the axis 53 of the electric current is parallel to the longitudinal direction of the parallel needles and the external magnetic field B is perpendicular to their longitudinal direction.

The graph in FIG. 6*a* indicates the dependence of the resistance change $\rho_B/\rho_0$ upon the magnetic induction B for different semiconductor members according to the invention consisting of InSb with segregated inclusions as described above. The curves 61, 62, 63, 64 shown in the graph were determined at normal room temperature (20° C.). Indicated along the abscissa is the magnetic induction B in kilogauss (kg.). The ordinate indicates the change in resistance by the numerical values of the ratio $\rho_B/\rho_0$, wherein $\rho_0$ denotes the specific resistance at zero magnetic field, and $\rho_B$ the specific resistance under the effect of the magnetic field. The semiconductor body in all cases represented in FIG. 6 consisted of InSb with inclusions of NiSb amounting to 1.8% by weight. Curve 61 relates to a semiconductor member according to the invention with spheriod inclusions irregularly distributed according to FIG. 2. The resistance change at 10,000 gauss was about 300%. Curve 62 relates to a semiconductor member with parallel needle-shaped inclusions oriented as shown in FIG. 3. In this case the resistance change at 10,000 gauss was about 200%. Curve 63 shows the resistance change for a semiconductor member with needle-shaped inclusions oriented in accordance with FIG. 5 and indicates a resistance change of about 100% with an external magnetic field of 10,000 gauss. Curve 64 relates to a semiconductor member with needle-shaped inclusions oriented in accordance with FIG. 4 and indicates that the resistance change for such an orientation reaches a maximum. In this case the resistance change was about 1,100% with a magnetic field of 10,000 gauss. In contrast with the values apparent from the graph, intrinsically conducting InSb at normal room temperature exhibits at 10,000 gauss a resistance change of about 55%.

The graph in FIG. 6*b* indicates the dependence of the resistance change $\rho_B/\rho_0$ upon the magnetic induction B for different semiconductor members according to the invention conisting of InSb with segregated inclusions of $CrSb_2$ amounting to 2.5% by weight. Curve 65 relates to a semiconductor member with parallel needle-shaped inclusions oriented as shown in FIG. 3. In this case the resistance change at 10,000 gauss was about 120%. Curve 66 relates to a semiconductor member with needle-shaped inclusions oriented in accordance with FIG. 4. In this case the resistance change was about 670% with a magnetic field of 10,000 gauss.

The graph shown in FIG. 7 indicates the dependence of the Hall voltage measured with a semiconductor member according to the invention consisting of InSb with inclusions of NiSb amounting to 1.8% by weight. The specific electric conductance was 259 (ohm-cm.$^{-1}$), and the charge carrier mobility $\mu$ was 20,500 cm.$^2$/v. second. The abscissa of the graph indicates the magnetic induction in kg., and the ordinate the Hall voltage $U_H$ in mv. The curve 71 differs from the known course of the Hall voltage versus magnetic induction by exhibiting a behavior similar to saturation effect. This characteristic is particularly suitable for use in control and regulating applications.

EXAMPLE I (*Method for oriented distribution of the inclusions*)

98.2 g. of InSb were melted together with 1.8 g. of zone-melted NiSb in a non-carburized quartz boat of semi-cylindrical inner shape and kept molten at 750 to 800° C. for about one hour. Thereafter the melt was subjected to normal freezing at an advancing rate of 2.7 mm./min. The resulting solid ingot was twice zone melted at a zone travel rate of 1 mm./min. The semi-cylindrical body of material thus obtained was cut into rods of the desired size.

EXAMPLE II (*Method for unoriented distribution of the inclusions*)

Indium antimonide was melted with 1.8% by weight of NiSb at a temperature of 750 to 800° C. for one hour in a non-carburized quartz boat. The homogeneous melt was then suddenly run out of the hot furnace zone so that no oriented solidification (normal freezing) of the melt could occur. Thereafter the resulting semicylindrical ingot was subdivided into rods of the desired size.

EXAMPLE III 326 g. of InSb were melted together with 15.8 g. of $Mn_2Sb$ and 8.3 g. Sb (corresponding to 6.9% by weight of MnSb) in a carburized quartz boat of semicylindrical inner shape and kept molten at 700° C. for about one hour in an atmosphere of Ar. Thereafter the homogeneous melt was then pulled out of the hot furnace at a rate of about 0.6 mm./min. so that the inclusions crystallize in an oriented manner.

EXAMPLE IV 195 g. InSb were melted with 5.0 g. $CrSb_2$ in an Ar atmosphre at 700° C. The homogeneous melt was subjected to normal freezing and afterwards zone-melted several times at a rate of about 1 mm./min.

The above-mentioned electrical or electromagnetical properties and operating characteristics of semiconductor members according to the invention are utilized to advantage and for the purpose of achieving novel improvements or novel effects in the electronic devices described presently with reference to FIGS. 8 to 21, each comprising such a semiconductor member as an operationally essential component.

FIGS. 8 to 11 relate to a continuously adjustable, stepless potentiometer. It comprises a magnet whose poles are denoted by N and S in FIG. 8. Disposed in the magnetic field between the poles is a semiconductor assembly which is rotatable about pivot pins P and comprises two semiconductor members S1 and S2 rigidly fastened together in mutually insulated relation. One end of member S1 is connected to a terminal A. The other end is connected to a terminal B to which the adjacent end of the second semiconductor member S2 is also electrically connected. The remaining end of semiconductor member S2 is connected to a terminal C. When the semiconductor assembly is rotationally adjusted to a different angular position, the voltage distribution between members S1 and S2 is changed in mutually inverse relation when a source of constant voltage is connected between terminals A and C as shown in FIG. 10. The effect is that of a potentiometer rheostat of a type shown in the substitute circuit diagram according to FIG. 11, except that the device according to the invention achieves the desired voltage division in a stepless manner and without the use of a mechanical slide contact. In conjunction therewith the device takes advantage of the greatly increased change in resistance as a result of changes in effective magnetic inductance achieved by the inclusions distributed in the semiconductor members, particularly if anisotropic inclusions are oriented as described above.

FIG. 12 shows a device of similar type in which two semiconductor members S3 and S4 according to the invention are attached to each other in mutually insulated relation and are shifted on a translatory path to a larger or smaller extent into the field between the poles N and S of a magnet 17. The performance is in accordance with the one described with reference to FIGS. 8 to 11.

A similar potentiometric operation is obtained with a device according to FIG. 13 in which only one semiconductor member 1 is used in series connection with an ordinary resistor 18 and in cooperation with a magnet 16. The resistor 18 may consist of a magnetically non-responsive resistor or it may also consist of a semiconductor member which, however, is not subject to changes of a magnetic field. It will be understood that instead of making the member 1 displaceable relative to the magnet 16, it may also be fixedly mounted in the field gap and the magnet be excited electrically for the purpose of changing its effective field strength to thereby change the resistance of the semiconductor member.

FIG. 14 illustrates schematically the circuit of a modulator capable of modulating a direct voltage or an alternating voltage of much lower frequency than the modulation to be applied. A semiconductor field plate or disc 25 with dispersed and preferably oriented inclusions according to the invention is mounted in the field gap of a magnetizable core 26 provided with an energizing coil 27. The semiconductor member 25 is connected in series with a source 28 of direct voltage (or low-frequency A.C. voltage) to the primary winding of a transformer 29 whose secondary winding is connected through an amplifier with the output terminals OT of the device. The modulating frequency is impressed across the input terminals IT, and the modulated output voltage is taken from the output terminals OT of the amplifier.

The advantages of such a modulator according to the invention will be understood from the following. Aside from performing the desired modulation, a device of this type also produces in the semiconductor member an induced voltage at the input frequency. The induced voltage interferes with the desired modulation. The size of the magneto-responsive field plate 25 must therefore be made very small in order to keep the induced voltage small, but the feasible reduction in size is limited. For example, when a semiconductor device according to FIG. 6 of the above-mentioned Patent 2,894,234 is used for such purposes, the spacing of the interposed metal layers 14 must be small relative to the width of the semiconducting resistor body. The feasible minimum width is approximately 50 microns. This corresponds to a width of 0.3 mm. for the metal layers. In contrast thereto, conductive anisotropic inclusions, such as the above-mentioned needle-shaped segregations of NiSb in InSb have a mutual spacing of only 2 to 3 microns. The semiconductor body can readily be given a width of 30 microns, for example. This reduces the semiconductor surface by the factor of $10^2$. The disturbing induced voltages are reduced in the same ratio. For example, with the known device having a semiconductor surface of 20 $mm.^2$, a signal at 5000 c.p.s. carrier frequency is transmitted together with a disturbing induced voltage of about 60 millivolts at 3,000 gauss, and an induced voltage of 30 microvolts at the second harmonic frequency of 10,000 c.p.s. For a signal voltage of 5 microvolts D.C., the measurable output voltage was approximately 1 microvolt. It will be apparent that if 1 microvolt is to be measured while simultaneously dealing with 30 microvolts second harmonic, the measurement is difficult and not of the desired reliability.

In contrast thereto, when a device according to the invention was used, employing a semiconductor member of InSb with oriented needle-shaped inclusions of NiSb as described above, the induced second harmonic voltage was about one-hundredth of the previously measured value, namely about 0.3 microvolt (10,000 c.p.s.) under otherwise comparable conditions. Consequently the measuring accuracy is greatly increased, aside from the fact that it is much easier to filter the 0.6 millivolt of 5,000 c.p.s. fundamental frequency than to filter the 60 millivolts. The invention therefore has virtually afforded a successful use of a modulating device of this type which, although known in principle, was not suitable in practice on the basis of the prior art.

The reduction in size of the resistor for a given performance is also of advantage for the above-described potentiometer devices. For a given ohmic resistance, the device is smaller than it can be made with semiconductor members of the known type mentioned above. Consequently, the magnets are also smaller and the air gaps are likewise smaller. On the other hand, for a given size of instrumentality, the current-carrying capacity of the semiconductor rheostat or potentiometer is considerably greater.

FIG. 15 illustrates the example of a fundamental circuit diagram for a Hall-plate device according to the invention as a component of a control or regulating system serving to effect current or voltage limitation. The current $i$ passes through input terminals IT and through a semiconductor Hall plate S with dispersed and preferably oriented anisotropic inclusions as described in the foregoing. It will be understood that the Hall plate S is exposed to a magnetic field. The current $i$ may be kept constant, in which case the desired control or regulation is effected in dependence upon the varying intensity of the magnetic field. The Hall voltage taken from probe-type Hall electrodes is applied to an amplifier AM whose output terminals OT are to be connected to the load circuit to be controlled or regulated. The Hall voltage impressed upon the amplifier and effecting the desired control or regulation depends upon the magnitude of the input current. However, due to the saturation-type characteristic of the semicondutcor member, typified by curve 71 in FIG. 7, the Hall voltage reaches a maximum value at a given current magnitude thus preventing over-control in the event the Hall plate S is subjected to excessively high magnetic fields.

Fig. 16 shows a semiconductor device according to the invention employed as a component of a regulating system. The device comprises a semiconductor member 35 with dispersed inclusions as described above. The member is disposed in the field gap of a magnetizable core 36 equipped with an energizing winding 37. The semiconductor member 35 forms one branch of a bridge network. The other branches comprise ohmic resistors 38, 39 and 40 respectively. The network is energized from a current source 41 and has a reversible control motor 42 connected with its output diagonal. While a direct connection of the motor is shown schematically, it will be understood that amplifying or relay means may be interposed. The shaft of motor 42 is connected with the movable slide contact 43 of a potentiometer 44 which is energized from a current source 45. The equipment to be regulated is schematically shown at 46 and assumed to consist of voltage generating means whose output voltage across buses 47 is to be kept constant. For regulation the tapped-off portion of the rheostat 44 is connected to the voltage control means (not shown) of the equipment 46. The energizing coil 37 receives voltage from a potentiometer 48 whose selected adjustment determines the datum value of bus voltage to be kept constant.

When the bus voltage is in accordance with the datum value, the bridge, calibrated by means of the adjustable resistor 38, is balanced and the motor 42 is at rest. When the voltage of buses 47 depart from the datum value, the coil 37 receives more or less energizing current than required for maintaining the semiconductor member 35 at the resistance that just balances the bridge network. Consequently, the network becomes unbalanced and the motor 42 runs in one or the other direction, thus changing the adjustment of the rheostat 44 in the sense and by the amount required to reestablish by means of coil 37 the proper resistance of member 35 at which the bridge network is balanced.

FIG. 17 illustrates an embodiment of the invention for the purpose of measuring the strength and direction of a magnetic field. A Hall plate 51 made according to the invention is subjected to the magnetic field being investigated and changes its ohmic resistance accordingly. This varies the voltage drop originating from the current supplied by a source 52 through a resistor 53. The voltage drop is indicated by a measuring instrument 54 and may also be amplified in order to be available at terminals 55 for any desired purposes. Another measuring instrument 56 is connected across the Hall electrodes of the Hall plate 51 to indicate by the polarity of the measured voltage the direction of the magnetic field.

FIGS. 18 and 19 relate to the use of the invention for transmitting a signal in response to a positional change. A semiconductor member 61 according to the invention is mounted along the travel path of a permanent magnet 62 whose travel direction, indicated by an arrow X, is across the semiconductor member. The semiconductor member 61 forms a bridge network together with resistors 63, 64 and 65. The input diagonal is energized by constant direct or alternating voltage. A measuring instrument 66 or any other desired electric device is connected in the output diagonal. As the magnet 62 approaches the vicinity of the semiconductor member 61, the output voltage of the bridge network reaches a maximum when the position of the magnet is closest to the semiconductor member. This position is denoted by O in the graph of FIG. 19 where the resulting voltage signal is typified by the curve $V_s$.

FIGS. 20 and 21 relate to a similar position-responsive device, the same components being denoted by the same respective reference numerals as in FIG. 18. According to FIG. 20 the semiconductor member 61 is premagnetized in a field gap between pole shoes 67 and 68 joined with a permanent magnet 69. This affords producing a signal output voltage $V_s$ of the type shown in FIG. 21. The signal voltage reverses its polarity as the relative position between the traveling magnet and the semiconductor member reaches closest proximity. As a result, the direction of approach can be determined from the signal voltage. It will be understood that in devices of the type according to FIGS. 18 and 20, the semiconductor member may be mounted on traveling structure, whereas the cooperating magnet may be given a fixed position. Proximity-responsive sensing devices of this type also take advantage of the increase in magnetic response or the reduction in dimensions afforded by virtue of the invention.

Relative to the foregoing references to inclusions consisting of compounds, it should be noted that these compounds need not, and often do not, have a strictly stoichiometric composition. For example, NiSb may have a homogeneity range of 46.3 to 53.3 atom percent Sb at room temperature (M. Hansen and K. Anderko, Constitution of Binary Alloys, McGraw-Hill Book Company, New York, 1958, page 1037). However, for obtaining suitable anisotropic segregations, particularly in the shape of needles, the semiconductor member should be produced from a homogeneous melt of substantially eutectic composition. Only then is a most desirable two-phase ingot with oriented anisotropic inclusions obtainable. Thus, when applying normal freezing or zone melting to InSb with 1.5 to 2% by weight of NiSb (within the above-mentioned range of homogeneity) the resulting NiSb inclusions have the shape of needles 10 to 60 microns long and about 1 to 2 microns in diameter, the spacing between the needles being about 2 to 3 microns, and the longitudinal axes being well aligned in parallel relation to the direction of progressing solidification. With semiconductor members made from an eutectic melt of InSb with an addition of 1.8% NiSb by weight of the InSb increases in magnetoresistance above 1700% at 10 kg. (room temperature) have been observed. The NiSb-phase segregated within the percentage range stated, does not effect doping of the InSb.

Other eutectic compositions particularly well suitable for the purposes of the invention are InSb with an addition of 2.9% $FeSb_2$, InSb with an addition of about 6.9% MnSb, InSb with 2.5% $CrSb_2$, GaSb with 80.1% Sb, for example.

It has been found that for obtaining highest resistance changes the inclusions should be uniformly distributed over the entire volume of the embedding substance, particularly in the case of $A^{III}B^{V}$ compounds. For the same reason, the inclusions should have preferably in one direction a dimension about one order of magnitude larger than in other directions, and a defined boundary surrounded on all sides by pure semiconductor substance.

Further embodiments of semiconductor members according to the invention are described presently.

InSb was melted together wih 6.9% (by weight) MnSb. The composition when melted forms an InSb-Mn-Sb eutectic. During normal freezing or zone melting of the ingot, the resulting segregations consist of ferromagnetic MnSb in form of well developed needles oriented parallel to the freezing direction. The freezing rate (zone melting) was 0.6 mm./min. A specimen of GaSb with needle-shaped inclusions of Sb was produced from a GaSb-Sb eutectic. The ingot was zone melted at the rate of 1.6 mm./min. InSb containing inclusions of Sb was made from an InSb-Sb eutectic melt which after solidification was subjected to zone melting at the rate of 1.6 mm./min. Further produced was InSb with an addition of 2.5% b.w. of $CrSb_2$. The eutectic composition of the melt resulted in segregation of $CrSb_2$ needles within embedding substance consisting of pure InSb. The ingots were zone melted at 1.0 mm./min. An Insb specimen containing 2.9% $FeSb_2$ was zone melted at the rate of 1.6 mm./min. A Ge-Ni specimen containing 62 atom percent Ge and 38 atom percent Ni (melting point 775° C.) was zone melted at 1.6 mm./min.

The specimens described in the foregoing paragraph were all made from isomorphous melts of eutectic composition containing a semiconductor main substance with an added substance soluble in each other only in the liquid state but not in the solid state so that a second insoluble phase segregates during freezing from the main phase constituted by the semi-conductor substance.

We claim:

1. A semiconductor member, comprising a crystalline body of homogeneous semiconductor material and a spacial matrix of discrete inclusions embedded in said material and being formed of substance selected from the group consisting of metals and metal compounds having higher conductance than said semiconductor material, said inclusions having anisotropic geometrical shapes substantially oriented parallel to one another and having fractionally small dimensions compared with the smallest dimension of said body.

2. A semiconductor member, comprising a crystal'ine body of semiconductor material having a planar surface and a multitude of discrete inclusions embedded in said material, said inclusions having geometrically anisotropic shapes of shorter length than the smallest dimens:on of said body and being oriented substantially in parallel relation to said surface, said inclusions consisting of non-doping substance selected from metals and metal compounds and having higher conductance than said semiconductor material.

3. A semiconductor member, comprising a crystalline body of material having two eutectic-forming phases mutually insoluble in the solid state, one of said two phases constituting the crystalline semiconducting bulk of said body and the other phase forming a multitude of segregations of anistropic geometric shapes and higher conductance than said one phase, said segregations being dispersed in said one phase and substantially parallel to one another.

4. In a semiconductor member according to claim 1, said inclusions being needle-shaped and parallel to a surface of said body.

5. In a semiconductor member according to claim 1, said inclusions being scale-shaped and having their respective scale planes substantially parallel to a surface of said body.

6. In a semiconductor member according to claim 1, said inclusions being ferromagnetic.

7. A semiconductor member, comprising a crystalline body of $A^{III}B^{V}$ semiconductor compound and a multitude of geometrically anisotropic inclusions of parallel orientation dispersed and embedded in said $A^{III}B^{V}$ compound and consisting of a $CB^{V}$ compound wherein C denotes substance from the group consisting of Fe, Ni, Co, Cr, Mn, said two compounds forming together a eutectic in the liquid state and their quantitative ratio in said body being substantially in accordance with their eutectic composition.

8. A semiconductor member, comprising a crystalline body of indium antimonide and discrete geometrically anisotropic inclusions in parallel orientation embedded in the indium antimonide, said inclusions being substance selected from the group consisting of the antimonides of iron, nickel, chromium, manganese and amounting to 2.9% for $FeSb_2$, 1.8% NiSb, 2.5% $CrSb_2$ and 6.9% for MnSb.

9. In a semiconductor member according to claim 1, said semiconductor material being from the group consisting of gallium antimonide, and said inclusions being formed of at least one substance selected from the group consisting of the antimonides of Fe, Ni, Co, Cr, Mn, the respective quantities of said semiconductor material and said inclusion substance being in a proportion corresponding substantially to their eutectic composition.

10. In a semiconductor member according to claim 1, said semiconductor material being germanium, and said inclusions being formed of at least one substance from the group consisting of the germanides of Fe, Ni, Co, Cr, Mn, the respective quantities of said semiconductor material and said inclusion substance being in a proportion corresponding substantially to their eutectic composition.

11. The method of producing a semiconductor member having a body of semiconductor material and having in said body a multitude of dispersed and integrally embedded inclusions of substance from the group consisting of metals and metal compounds having a higher conductance than said semiconductor material, comprising the steps of mixing the semiconductor material and the inclusion substance in substantially eutectic proportion and melting the mixture to a homogeneous eutectic melt, thereafter cooling the melt to cause the inclusion substance to segregate in anisotropic form and simultaneously subjecting the evolving segregations to parallel orientation.

12. The semiconductor production method according to claim 11, wherein the melt is subjected to normal freezing to effect solidification and orientation of the segregating inclusions.

13. The semiconductor production method according to claim 11, wherein the melt is permitted to cool and the ingot thereafter subjected to zone melting for orienting the inclusions.

14. The semiconductor production method according to claim 11, comprising the step of applying to the melt during cooling an external magnetic field for thereby orienting the segregating inclusions.

References Cited by the Examiner

UNITED STATES PATENTS

| | | | |
|---|---|---|---|
| 2,691,577 | 10/1954 | Lark-Horovitz | 75—134.7 |
| 2,704,708 | 3/1955 | Welker | 75—134.7 |
| 2,778,802 | 1/1957 | Willardson et al. | 148—1.5 |
| 2,813,048 | 11/1957 | Pfann | 75—135 |
| 2,858,275 | 10/1958 | Folberth | 75—134.7 |
| 2,894,234 | 7/1959 | Weiss | 338—32 |
| 3,042,887 | 7/1962 | Kuhrt | 338—32 |

DAVID L. RECK, *Primary Examiner.*

RICHARD M. WARD, *Examiner.*